July 26, 1960 R. J. KYLER 2,946,901

SWITCHING CIRCUIT FOR DIFFERENTIATOR

Filed Sept. 22, 1958

INVENTOR.
ROBERT J. KYLER
BY Wade Koontz
ATTORNEY
James S. Shannon
AGENT 2,946,901
Patented July 26, 1960

2,946,901

SWITCHING CIRCUIT FOR DIFFERENTIATOR

Robert J. Kyler, Baltimore, Md., assignor, by mesne assignments, to the United States of America as represented by the Secretary of the Air Force Filed Sept. 22, 1958, Ser. No. 762,669
3 Claims. (Cl. 307—88.5)

In radar receivers it is often desirable to have a differentiating or short time constant circuit that can be switched into or out of the video circuit at will. The differentiating circuit is usually an RC circuit having a time constant equal to the radar pulse duration. A relay is usually employed to switch this circuit into and out of the system, however, the relay must be located as near as possible to the differentiating circuit which creates a space problem, and a relay also has the disadvantages of added weight, a power requirement and uncertain reliability.

The object of the invention is to provide a differentiating circuit switching means that is of small size and therefore can be built easily into the system at the location of the differentiating circuit and operated from a remote point, that is voltage operated and therefore requires no power and that is very reliable in operation. Briefly, this is accomplished through the use of unidirective devices, preferably semiconductor diodes, in a manner which will be explained in detail with reference to the specific embodiments of the invention shown in the accompanying drawings in which, Fig. 1 shows a differentiating circuit switching arrangement for positive pulse signals.

Figure 1:
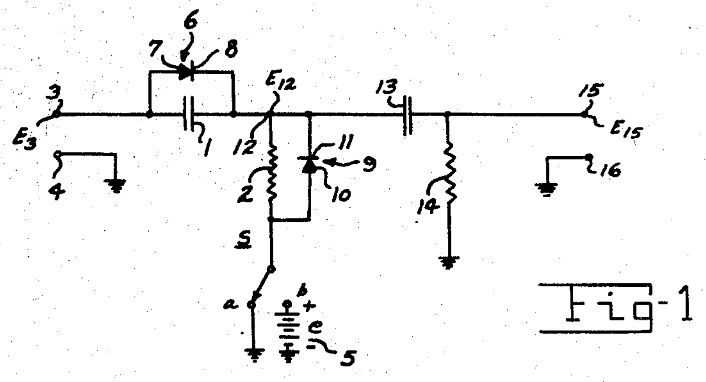
Figure 2:
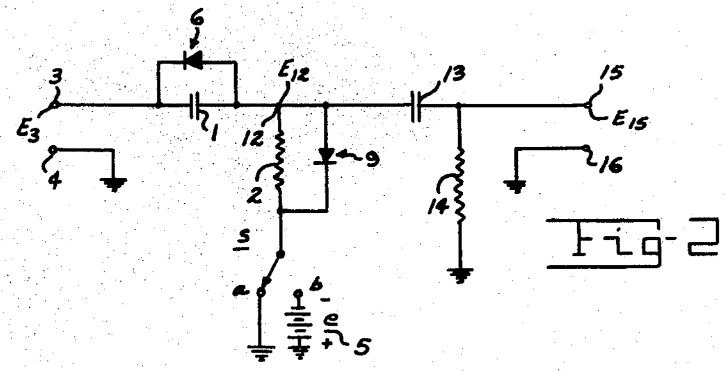
Figure 3:
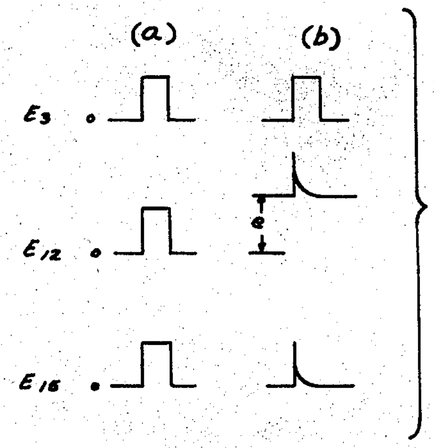

Fig. 2 shows a differentiating circuit switching arrangement for negative pulse signals, and Fig. 3 gives waveforms at various points in Fig. 1.

Referring to Fig. 1, the differentiating circuit consists of a series condenser 1 and a shunt resistor 2 connected across input terminals 3, 4, the lower end of resistor 2 being connected either to ground through contact *a* of switch S or to the positive terminal of a source of direct control potential 5 of voltage *e*. The condenser 1 is shunted by a undirectional device 6, which preferably is a semiconductor diode, but could be a vacuum diode, having an anode 7 and a cathode 8. Resistor 2 is shunted by unidirectional device 9, which may also be a diode, preferably a semiconductor diode, having an anode 10 and a cathode 11. The output from the differentiating circuit appears between point 12 and ground and may be applied over a relatively long time constant coupling circuit, consisting of a direct current blocking condenser 13 and shunt resistor 14 to a load circuit coupled to terminals 15, 16.

The circuit of Fig. 1 is designed to operate with an input signal at terminal 3 that is positive relative to ground. This signal may be, for example, a positive pulse signal of constant repetition rate such as encountered in radar systems. When switch S is on contact "*a*" the differentiating circuit is excluded from the circuit and a positive pulse at terminal 3 is transmitted without change in waveform to terminal 15. This is true since the positive pulse at terminal 3 tends to drive the anode of diode 6 positive relative to its cathode causing this diode to conduct and, in effect, connect terminal 3 to point 15.

Since diode 9 does not conduct, its cathode being always positive relative to its anode, the waveform at point 12 is the same as that at terminal 3. Since long time constant coupling circuit 13—14 has negligible effect on the waveform of the signal, the output signal at terminals 15, 16 is also similar to the input signal at terminals 3, 4. The voltages $E_3$, $E_{12}$ and $E_{15}$, at points 3, 12 and 15 respectively, for position "*a*" of switch S are shown at (*a*) in Fig. 3.

The differentiating circuit is rendered effective by placing switch S on contact "*b*" introducing the positive voltage *e* into the circuit. The magnitude of *e* must be greater than the maximum value of $E_3$. Under this condition, the anode of diode 6 can never become positive relative to the cathode and the diode remains an open circuit. Also, diode 9 is an open circuit whenever point 12, which is connected to its cathode, is any amount positive relative to the lower end of resistor 2 to which the anode is connected. Therefore, the signal must pass through condenser 1 and be differentiated, the differentiated signal, added to the constant potential *e*, appearing at point 12. While diode 9 does not prevent point 12 from going positive relative the lower end of resistor 2, it does prevent point 12 from going negative relative to the lower end of this resistor. Therefore, the discharge current from condenser 1 that would normally flow upward through resistor 2 and lower the potential of point 12 when $E_3$ falls to zero at the trailing edge of the input pulse, instead flows through diode 9 without any appreciable effect on the potential of point 12, so that the negative pulse at the trailing edge of the input signal is eliminated. The waveform at point 12 is transmitted without change to output terminals 15—16 by relatively long time constant coupling circuit 13—14. The voltages $E_3$, $E_{12}$ and $E_{15}$ for operation with switch S on contact "*b*" are shown at (*b*) in Fig. 3.

While the circuit of Fig. 1 was designed for positive input pulses it may be made to operate equally well with negative input pulses. The only changes necessary are to reverse the polarities of diode 6, diode 9 and source 5. The waveforms for negative pulses are identical to those shown in Fig. 3 for positive pulses with their polarities, and the polarity of *e*, reversed.

The control switch S may be of any suitable type, mechanical or electronic, and may be located at a point remote from the differentiating circuit.

I claim:

1. A differentiating circuit for unipolar signals that can be changed from an ineffective state to an effective state by the application of a control potential, said circuit comprising: a condenser, a resistor, means connecting one terminal of said condenser to one terminal of said resistor, a switching device connected to the other terminal of said resistor and operating to selectively connect this terminal to either of two points one of which is a point of reference potential and the other of which has a direct control potential of predetermined magnitude relative to said point of reference potential, means for applying a unipolar input signal between the other terminal of said condenser and said point of reference potential, a unidirectional diode connected across said condenser and poled so that said input signal acts thereon in the conductive direction, the said predetermined magnitude of said control potential being greater than the maximum magnitude of said input signal and the polarity of said control potential being so as to act on said diode in the nonconductive direction, and means for coupling an output circuit between the connected terminals of said condenser and resistor said point of reference potential.

2. Apparatus as claimed in claim 1 in which a second unidirectional diode is connected in shunt to said resistor and poled so that said input signal acts thereon in the nonconductive direction.

3. Apparatus as claimed in claim 2 in which said output circuit coupling means contains a direct current blocking device.

References Cited in the file of this patent

UNITED STATES PATENTS

| | | |
|---|---|---|
| 2,843,765 | Aigrain | July 15, 1958 |
| 2,851,614 | Emanuelsson | Sept. 9, 1958 |
| 2,860,260 | Sykes | Nov. 11, 1958 |

FOREIGN PATENTS

| | | |
|---|---|---|
| 579,532 | Great Britain | Aug. 7, 1946 |